P. Werni,
Converting Motion.

No. 45,779.      Patented Jan. 3, 1865.

Witnesses:
Theo Tusch
Henry Morris

Inventor:
P. Werni
per Munn & Co
Attorneys

UNITED STATES PATENT OFFICE.

P. WERNI, OF MANCHESTER, MICHIGAN.

IMPROVEMENT IN CONVERTING ROTARY INTO RECIPROCATING MOTION

Specification forming part of Letters Patent No. 45,779, dated January 3, 1865.

*To all whom it may concern:*

Be it known that I, P. WERNI, of Manchester, in the county of Washtenaw and State of Michigan, have invented a new and useful Improvement in Converting Rotary into Reciprocating Motion; and I do hereby declare that the following is a full, clear, and exact description thereof, which will enable others skilled in the art to fully understand and use the same, reference being had to the accompanying drawings, forming part of this specification, in which—

Figure 1:
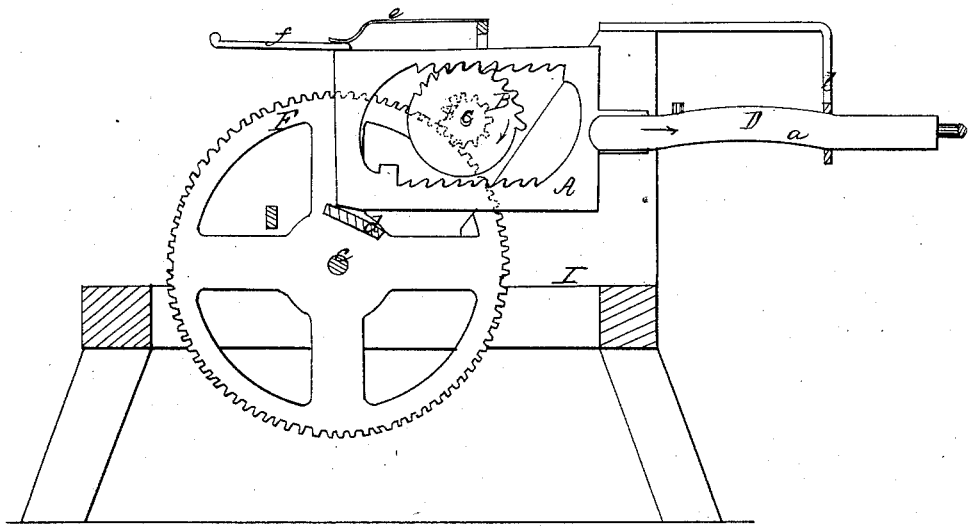
Figure 2:
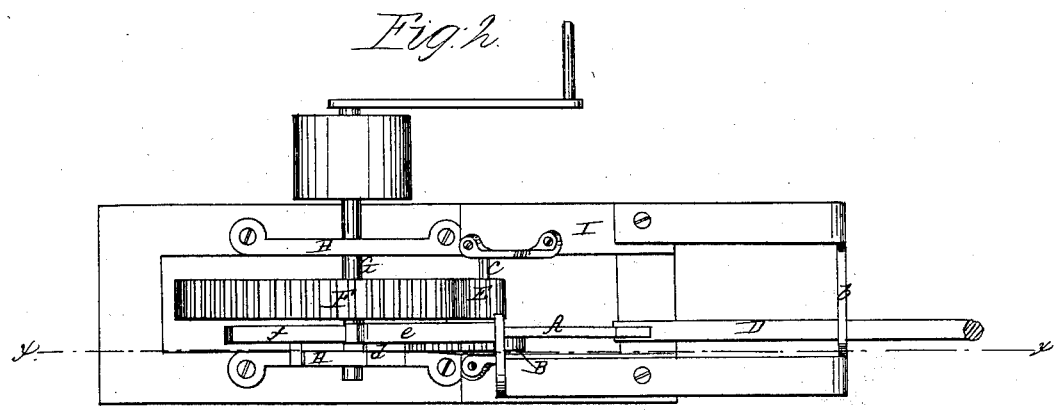

Figure 1 is a longitudinal vertical section of this invention, taken in the plane indicated by the line $x\ x$, Fig. 2. Fig. 2 is a plan or top view of the same.

Similar letters of reference indicate like parts.

This invention relates to an improvement in that class of devices for converting rotary into reciprocating motion, in which a pinion is used which has its teeth cut away on one-half of its circumference, and which gears alternately in the upper and then in the lower edge of a double rack, so that by imparting to said pinion a rotary motion the double rack assumes a reciprocating rectilinear motion. The principal difficulty with such and similar devices heretofore used has been to cause the teeth of the pinion, on leaving one rack, to engage without fail in the other rack; and in order to overcome this difficulty I have combined with the reciprocating rack two inclined planes, one on either end, and also a spring, in such a manner that by the action of said inclined planes and spring the double rack, on arriving at either end of its stroke, is brought in the most favorable position to allow the teeth of the pinion to disengage from the one and engage with the other rack with perfect accuracy and without producing injurious shocks.

A represents a double rack, which straddles the pinion B, as clearly shown in Fig. 1 of the drawings. This pinion is secured to the end of an axle, C, and its teeth are cut away on one-half of its circumference, so that the same on being rotated alternately gears in the lower and then in the upper rack. In order to compel the pinion to disengage from one rack and engage with the other at the end of each stroke, the shank D of the double rack is curved so as to form an inclined plane, $a$, and said shank passes through a stationary bracket, $b$, provided with a hole fitting closely to the same, so that by imparting to the double rack a reciprocating motion the sinuosities of the shank compel the same to rise and fall and to adjust itself in the requisite position to allow the teeth of the pinion to engage and disengage without fail at one end of the stroke of the rack. The position of the rack at the opposite end of its stroke is governed by a stationary inclined plane, $d$, which is secured in such a position that the double rack, on coming in contact with it, is compelled to rise and adjust itself in the desired position. A spring, $e$, pressing on an arm, $f$, which extends from the rear edge of the double rack, assists in keeping said rack in the proper position.

The axle C of the pinion B has its bearings in suitable boxes attached to the frame I and a cog-wheel or pinion, E, which is mounted on said axle, gears in a large cog-wheel, F, that is firmly keyed to the driving-shaft G. This shaft has its bearings in suitable boxes, H, secured to the frame I, and it receives motion by a belt stretched over a pulley, J, or in any other suitable manner. The rotary motion imparted thereby to the axle C is converted into a reciprocating rectilinear motion of the double rack A, and a saw or other similar tool or implement can be operated thereby with comparatively little power and exertion.

I claim as new and desire to secure by Letters Patent—

The employment of inclined planes $a\ d$ and spring $e$, in combination with the double rack A and pinion B, constructed and operating substantially as and for the purpose set forth.

P. WERNI.

Witnesses:
JOHN D. MERITHEW,
CHARLES SCHELL.